United States Patent [19]
Brown et al.

[11] Patent Number: 6,108,324
[45] Date of Patent: Aug. 22, 2000

[54] APPARATUS AND METHOD FOR PERFORMING A SIGNAL SEARCH IN A WIRELESS COMMUNICATION SYSTEM

[75] Inventors: Tyler A. Brown, Mundelein; Michael Mao Wang, Carpentersville, both of Ill.

[73] Assignee: Motorola, Inc., Schaumburg, Ill.

[21] Appl. No.: 09/158,486

[22] Filed: Sep. 22, 1998

[51] Int. Cl.[7] .................................................. H04B 7/216
[52] U.S. Cl. ............................................ 370/335; 375/206
[58] Field of Search ..................................... 370/204, 208, 370/209, 210, 205, 320, 335, 342; 375/200, 206, 347, 348, 349

[56] References Cited

U.S. PATENT DOCUMENTS 5,530,716   6/1996   Lipa .......................................... 375/206

*Primary Examiner*—Valencia Martin-Wallace
*Assistant Examiner*—Kim T. Nguyen
*Attorney, Agent, or Firm*—Kenneth A. Haas

[57] ABSTRACT

A search metric adjustor (401) for use in a base station receiver assembly (400) which operates in a CDMA wireless communication system conveying a mobile communication signal (107), is disclosed. The search metric adjustor (401) produces an adjusted energy value (490) that is utilized by a sorter (265) in a receiver signal searcher (200) to select a set of valid time offsets at which effective demodulation of the mobile communication signal (107) may occur. The search metric adjustor (401) compares a first plurality of Walsh symbol energy values (245), output from the receiver signal searcher (200), to a second plurality of Walsh symbol energy values (342), output from a spread spectrum receiver (300). The comparison yields a walsh symbol match count (470), correlated to a predetermined energy value (480) which is then added to an energy metric (241) to produce the adjusted energy value (490).

22 Claims, 4 Drawing Sheets

# APPARATUS AND METHOD FOR PERFORMING A SIGNAL SEARCH IN A WIRELESS COMMUNICATION SYSTEM

FIELD OF THE INVENTION

The present invention relates generally to wireless communication systems and, more particularly, to a method and apparatus for performing a signal search in a wireless communication system.

BACKGROUND OF THE INVENTION

Communication systems that utilize coded communication signals are known in the art. One such system is a direct sequence code division multiple access (DS-CDMA) cellular communication system, such as set forth in the Telecommunications Industry Association Interim Standard 95B (TIA IS-95B) herein after referred to as IS-95. In accordance with IS-95, the coded communication signals used in the DS-CDMA system comprise spread spectrum signals which are transmitted in a common 1.25 MHz bandwidth channel between mobile communication units and base transceiver stations (BTS) located at base sites of the wireless communication system. Each 1.25 MHz bandwidth portion of the radio-frequency (RF) spectrum, or 1.25 MHz bandwidth channel, carries spread spectrum signals centered around a particular carrier frequency and is commonly referred to as a narrowband DS-CDMA channel. Information from a mobile communication unit is modulated by the carrier frequency within the 1.25 MHz bandwidth channel by means of orthogonal waveforms, and without benefit of a pilot signal. Accordingly, recovery of the spread spectrum signals by a BTS is enabled via the use of well known, non-coherent demodulation techniques.

A mobile communication signal transmitted from a mobile communication unit to a BTS, may be reflected off of nearby scatterers, such as buildings, and result in multipath propagation of the transmitted signal. These reflections produce replicas, typically referred to as multipath replicas, of the originally transmitted signal which arrive at a base site receiver with various power levels at various times. The power levels, commonly referred to as path energies are determined by propagation distances traveled by the multipath replicas as well as environmental conditions. Upon receipt by the BTS, the originally transmitted signal and its multipath replicas are filtered, correlated, despread, recombined and decoded to yield the desired voice or data signal.

For purposes of discussion, the BTS includes a base station receiver assembly which includes a multipath signal searcher and a spread spectrum receiver. The presence of multipath replicas is typically detected using the multipath signal searcher comprised of multiple searcher paths searching at multiple time offsets. The ability of the multipath signal searcher to detect the multipath replicas is determined in part, by a received path energy of the multipath signal. Each received path energy yields a path energy metric as a result of estimating Walsh symbol energies by the searcher path. Accordingly, prior art multipath signal searchers utilize only a plurality of path energy metrics to direct selection of multipath signals for non-coherent demodulation by the spread spectrum receiver.

The received path energy is proportional to the operating Eb/Io (energy per bit divided interference spectral density) or signal-to-noise ration (SNR) of the receiver. Therefore by lowering the operating Eb/Io of the spread spectrum receiver, as can be done using quasi-coherent instead of non-coherent demodulation, a desirable increased system capacity and transmission range may result. Unfortunately, the advantage of lowering Eb/Io operation of the spread spectrum receiver is compromised when the multipath signal searcher is unable to detect incoming multipath replicas. Accordingly, less total signal energy is available for demodulation and decoding, and therefore a less robust signal, representative of the transmitted mobile communication signal, is produced.

Therefore, a need exists, for a method and apparatus to provide a signal search capability within an IS-95 wireless communication system that is easy to implement and overcomes low multipath signal detection in spead spectrum receivers.

DETAILED DESCRIPTION OF THE PREFERRED EMBODIMENT

Figure 1:
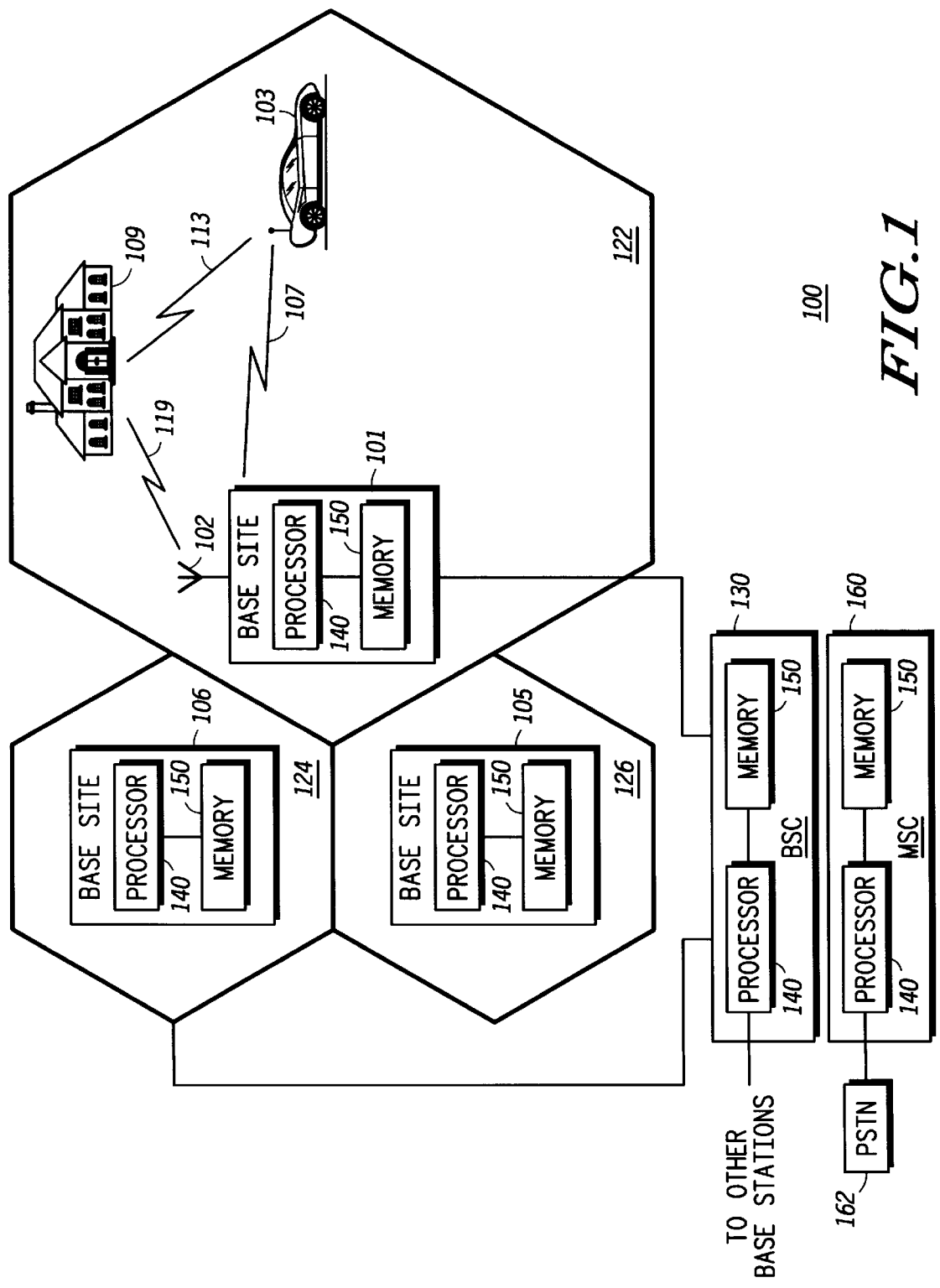
FIG. 1 depicts a typical prior art wideband CDMA wireless communication system 100.

An improvement for tracking a mobile communication signal that operates in an IS-95 code division multiple access wireless communication system is presented. This approach employs a search metric adjustor 401 in conjunction with a prior art receiver signal searcher 200 and a prior art spread spectrum receiver 300, to provide an improved multipath signal tracking capability to a base station receiver assembly 400.

Stated specifically, search metric adjustor 401 for use in a base station receiver assembly 400 code division multiple access (CDMA) wireless communication system conveying a mobile communication signal, is described herein. Search metric adjustor 401 produces an adjusted energy value 490 that is utilized by a sorter 265 in receiver signal searcher 200 to select a set of valid time offsets at which effective demodulation of the mobile communication signal 107 may occur.

Search metric adjustor 401 operates to compare a first plurality of Walsh symbol energy values 245, output from receiver signal searcher 200, to a second plurality of Walsh symbol energy values 342, output from a spread spectrum receiver 300. A first set of top Walsh symbol indices 450 corresponding to first plurality of Walsh symbol energy values 245 are selected by a first index selector 448. Similarly, a second set of top Walsh symbol indices 451 corresponding to second plurality of Walsh symbol energy values 342 are selected by a second index selector 448. A comparison of first set of top Walsh symbol indices 450 to second set of top Walsh symbol indices 451 yields a count of a number of times at least two corresponding Walsh symbol indices are identical. Such a count referred to as a walsh symbol match count (WSMC) 470 generated by a counter 465 over a specified time period, for example six Walsh symbols, results from input of the number of times at least two corresponding Walsh symbol indices are identical. A look-up table 475 converts WSMC 470 to a predetermined energy value 480. Predetermined energy value 480 is then added to an energy metric 241 output from multipath signal searcher 200, to produce a signal 490. Signal 490 is comprised of an adjusted energy value and is representative of a likelihood that a time offset selected by a finger manager 275 corresponds to a valid time offset of mobile communication signal 107.

Turning now to the drawings, wherein like numerals designate like components, FIG. 1 depicts a typical prior art CDMA wireless communication system 100. CDMA wireless communication system 100 preferably comprises a direct spread code division multiple access (DS-CDMA) cellular communication system, although a multi-carrier CDMA cellular communication system may be suitable.

CDMA wireless communication system 100 includes base sites 101, 106, 105 providing service to coverage areas 122, 124, and 126 respectively, and one or more mobile stations although only one mobile station 103 is shown. Base sites 101, 105 and 106 include, among other things, a processor 140 and a memory 150. Base site 101 includes a transceiver (not shown) which transmits coded communication signals to, and receives coded communication signals from, mobile station 103 via an antenna 102.

A spread spectrum receiver, preferably a RAKE receiver within the BTS provides tracking capability of incoming multipath coded communication signals from mobile stations, the construction and operation of RAKE receivers being well known in the art. Similarly, mobile station 103 includes a transceiver that transmits coded communication signals to, and receives coded communication signals from, base site 101 within a coverage area 122. A mobile communication signal 103 transmitted from mobile station 107 may include voice, video, and/or data.

Base sites 101, 105, and 106 are coupled to a base station controller (BSC) 130, which includes, among other things, a processor 140 and a memory 150, and which is in turn coupled to a mobile switching center (MSC) 160, also including a processor 140 and a memory 150. MSC 160 is coupled to a public switched telephone network (PSTN) 162 using known techniques.

Mobile communication signal 107 is conveyed between mobile station 103 and base site 101 through a radio frequency (RF) channel. The RF channel includes a reverse-link (mobile station 103 to base site 101) and a forward-link (base site 101 to mobile station 103). Mobile communication signal 107 includes an a pseudo-random short code (not shown) associated with and assigned by base site 101, and a mobile unique pseudo-random long code mask (not shown). The inclusion of the codes results in a mobile unique pseudo-random noise sequence (PN sequence) for mobile station 103, which is identifiable by the spread spectrum receiver at base site 101.

Signals 119 and 113 are multipath replicas of mobile transmitted signal 107, due, for example, to reflections of mobile communication signal 107 off of scatterers such as building 109. Multipath replica 119 of mobile communication signal 107, and mobile communication signal 107 arrive at base site 101 at different times, time offset from a reference time, commonly referred to as a pn-offsets. The different pn-offsets are the result of varying propagation distances.

Figure 2:
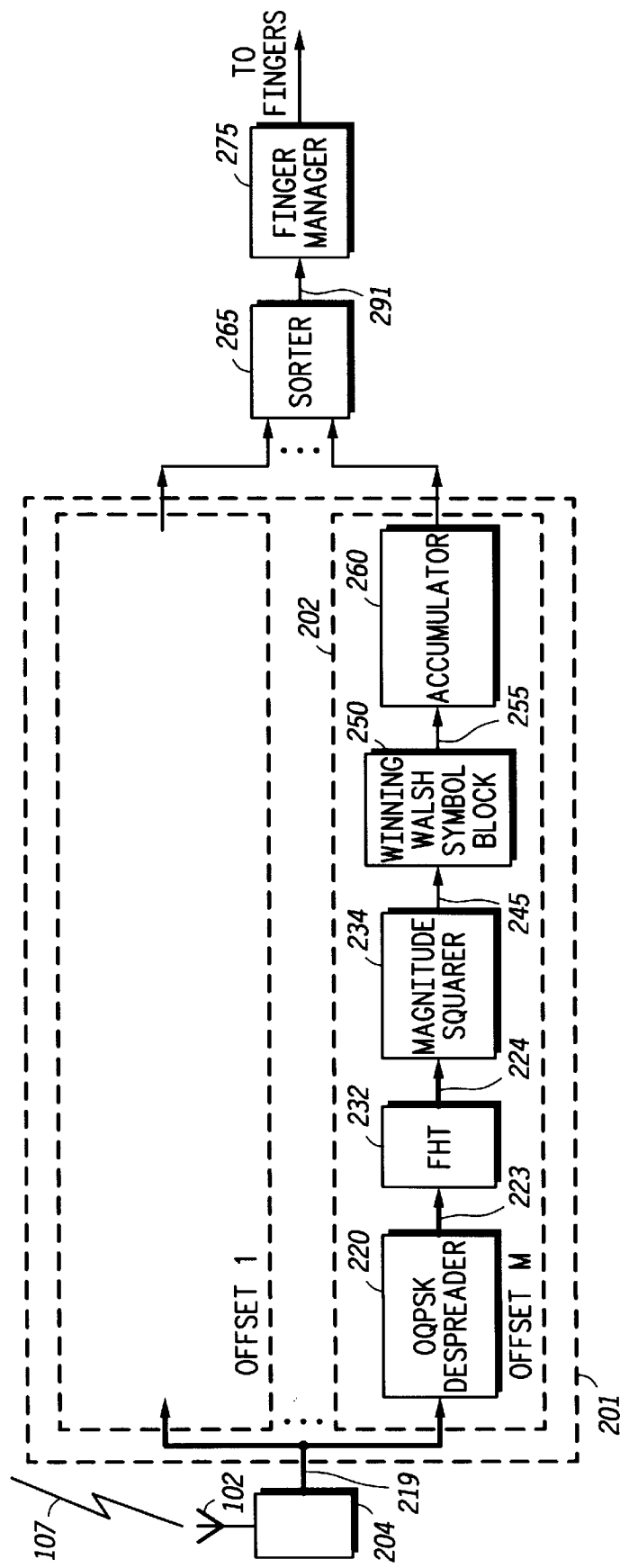
FIG. 2 is a block diagram of a prior art multipath signal searcher 200 used to identify time offsets associated with mobile communication signals and their multipath replicas in an IS-95 wireless communication system.

FIG. 2 is a block diagram of a prior art multipath signal searcher 200 used to identify valid time offsets associated with mobile communication signal 107 and it's multipath replicas. A signal energy metric 241 associated with a particular time offset is used by multipath signal searcher 200 to select a pn-offset, or valid time offset, associated with an appropriate multipath signal for demodulation by a spread spectrum receiver. In order to demodulate the transmissions from a particular mobile communication unit, the base station receiver assembly must first differentiate the multipath signals associated with a particular mobile communication unit from other multipath signals as well as simple noise associated with other nearby transmitters. This identification of a particular mobile communication unit's multipath signals, including their locations with reference to the pn-offset, begins as an antenna, or multipath signal search. In digital wireless communication systems, the pn-offset is measured in increments of time referred to as pseudorandom noise (PN) chips. Each PN chip is approximately equivalent to the inverse of the occupied bandwidth, e.g. 814 nanoseconds (ns) for a 1.2288 MHz system.

In a sectorized antenna system, there are generally two antennas for each of the sectors. For a typical path-diversity demodulation process multipath signal searcher 200 identifies the strongest received multipath signals via correlating known PN sequences with the incoming multipath signal over a range of pn-offsets, or time offsets. The range of pn-offsets is commonly referred to as a search window. Multipath signal searcher 200 then calculates the received multipath signal energies across the search window, incremented in ½ PN chip steps, for a set of antennas but does not demodulate or decode the information at these offsets. A received energy metric 241 that exceeds a predetermined energy threshold may indicate that a valid mobile station transmission has been captured at that particular pn-offset.

Multipath signal searcher 200 may be configured such that antennas within a sector are searched serially. After all the antennae have been searched, the searcher paths of multipath signal searcher 200 outputs the winning energy metrics at their associated pn-offsets. The resulting pn-offsets are then compared in a finger manager 275 to the previously selected pn-offsets. The previously selected pn-offsets may or may not be replaced by one or more of the resulting pn-offsets, depending on an finger assignment algorithm in finger manager 275. Accordingly, receiver finger demodulator paths are assigned to track and demodulate multipath signals at the selected pn-offsets.

Generally, in an IS-95 wireless communication system, multipath signal searcher 200 despreads multipath signals received at an antenna 102 to assess their energy levels at corresponding time offsets. Multipath signal energy levels are assessed using well known non-coherent demodulation techniques in order to determine whether or not the incoming signals are representative of mobile communication signal 107. Multipath signal searcher 200 includes a RF receiver front-end block 204 for front-end processing and a plurality of searcher paths, although only a search path 202 is shown in detail. Searcher path 202 includes an offset quadrature phase shift keying OQPSK depreader 220, a Fast Hadamard Transform (FHT) 232, a magnitude squarer 234, a winning Walsh symbol block 250, and an accumulator 260.

A plurality of energy metrics output from the plurality of searcher paths searching at a corresponding plurality of time offsets, provides a plurality of inputs to a sorter 265. The plurality of inputs include an equivalent plurality of energy metrics, for example energy metric 241 output from searcher path 202, to sorter 265. Sorter 265 then selects a best set of time offsets 291 based on the plurality of energy metrics, and then forwards best set of time offsets 291 to a finger manager 275. Best set of time offsets 291 are used by finger manger 275 to subsequently direct receiver finger tracking and demodulation.

Multipath signal searcher 200 receives a mobile communication signal 107 in the form of multipath replicas via antenna 102. Front-end processing such as intermediate frequency demodulation, analog automatic gain control (AGC), and analog-to-digital (A/D) conversion of mobile communication signal 107 is performed by well known methods and circuits at RF receiver front-end block 204. The analog AGC is typically employed in front of the analog-to-digital (A/D) converter in order to reduce the dynamic operating range of the A/D converter. In addition, RF receiver front-end block 204 further converts the digital signal output from the A/D converter to a set of gain adjusted in-phase (I) and quadrature (Q) components 219.

Set of gain adjusted in-phase (I) and quadrature (Q) components 219 is despread by OQPSK despreader 220 which removes a PN code sequence, added to the mobile communication signal prior to transmission by the mobile station. For each gain adjusted in-phase (I) and quadrature (Q) component, OQPSK despreader 220 yields a data in-phase (I) and quadrature (Q) component 223 at a time offset. It is contemplated that multiple OQPSK depreaders, despreading at all time offsets within the search window, or a single OQPSK despreader, despreading itteratively across the search window, may be utilized.

Data in-phase (I) and quadrature (Q) component 223 is then input to an orthogonal demodulator such as FHT 232. FHT 232 may be implemented using commercially available hardware as an array of adders or as a multiplexed adder, depending on its size. Alternatively, FHT 232 may be implemented utilizing a conventional digital signal processor (DSP) such as a Motorola DSP, part no. 56166 or an application specific integrated circuit (ASIC).

Upon receiving data in-phase (I) and quadrature (Q) component 223, FHT 232 operates using well known methods. Accordingly, FHT 232 generates sixty-four in-phase (I) and sixty-four quadrature phase (Q) outputs, or sixty-four pairs of in-phase (I) and quadrature (Q) outputs. Each pair of the of sixty-four outputs has an index that references one of the sixty-four possible Walsh symbols generated by an M-ary orthogonal modulator (not shown) in mobile communication unit 103. Thus, in the IS-95 reverse link channel, when data in-phase (I) and quadrature (Q) component 223 is input to FHT 232, two sets of sixty-four output signals which correlate to sixty-four possible transmitted Walsh codes are produced. For simplicity, sixty-four pairs of data in-phase (I) and quadrature (Q) components will be referred to collectively as output signal 224.

Upon receiving output signal 224, a magnitude squarer 234 magnitude squares the sixty-four pairs of in-phase (I) and quadrature (Q) components indexed from zero to sixty-three. Magnitude squarer 234 outputs sixty-four real values corresponding to Walsh symbol energy values, each of the real values including an index. The Walsh symbol energy value generally corresponds to a measure of confidence, or a likelihood that the index corresponds to a transmitted Walsh symbol. The associated energy value with the largest magnitude, commonly referred to as a winning Walsh symbol energy value 255, is then selected by winning Walsh symbol block 250. Accumulator 260 then accumulates winning Walsh symbol energy value 255 over a time period. The time period may be any length of time equivalent to period of time of N Walsh symbols. Accumulator 260 yields an energy metric 241 representative of a likelihood that the time offset at which searcher path 202 is searching corresponds to a valid time offset of mobile communication signal 107.

Sorter 265 sorts and ranks energy metric 241 with the plurality of other energy metrics resulting from other searcher paths to produce best set of time offsets 291 substantially likely to correspond to a plurality of valid time offsets of mobile communication signal 107. Accordingly, best set of time offsets 291 is based solely on the plurality of energy metrics output from searcher paths such as searcher path 202. Best set of time offsets 291 is then utilized by a finger manager algorithm in finger manager 275 to direct a plurality of receiver finger demodulator paths (shown in connection with FIG. 3) to demodulate mobile communication signal 107 at best set of time offsets 291.

Multipath signal searcher 200 may be implemented using an application specific integrated circuit (ASIC) or using other suitable means.

Figure 3:
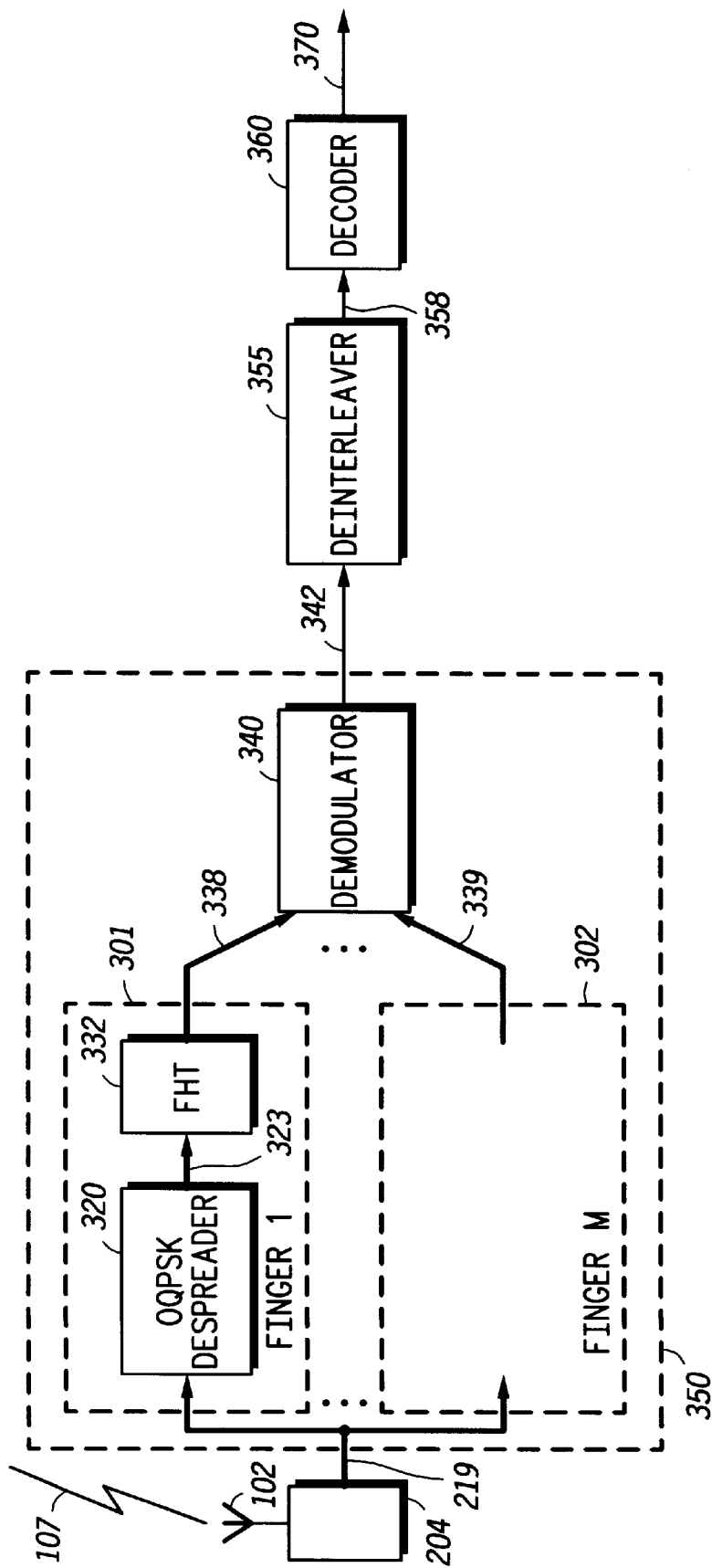
FIG. 3 is a partial block diagram of a prior art spread spectrum receiver 300 used to demodulate the mobile communication signal at time offsets selected by multipath signal searcher 200.

FIG. 3 is a partial block diagram of a prior art spread spectrum receiver 300 used for demodulating mobile communication signal 107 and it's multipath replicas at best set of time offsets 291 selected by multipath signal searcher 200. Generally, spread spectrum receiver 300 despreads and demodulates received multipath signals at assigned time offsets likely to correspond to valid time offsets of mobile communication signal 107. Spread spectrum receiver 300 includes an antenna 102 for receiving incoming signals, and a RF receiver front-end block 204 for front-end processing. Spread spectrum receiver 300 further includes a plurality of receiver finger demodulator paths although only one finger demodulator path 301 is shown in detail. Spread spectrum receiver 300 also includes a demodulator 340 for demodulating the outputs resulting from the plurality of receiver finger demodulator paths. Spread spectrum receiver 300 further includes a deinterleaver 355 and a decoder 360.

Spread spectrum receiver 300 receives mobile communication signal 107 via antenna 102. Front-end processing such as intermediate frequency demodulation, analog automatic gain control (AGC), and analog-to-digital (A/D) conversion of mobile communication signal 107 is performed by well known methods and circuits at RF receiver front-end block 204. In addition, RF receiver front-end block 204 further converts the digital signal, output from the A/D converter, to a set of gain adjusted in-phase (I) and quadrature (Q) components 219.

Set of gain adjusted in-phase (I) and quadrature (Q) components 219 at an assigned time offset, the assignment based on best set of time offsets 291, is input to receiver finger demodulator path 301 for transformation into a Walsh symbol stream 338. Similarly, set of gain adjusted in-phase (I) and quadrature (Q) components 219 at another assigned time offset is input into another receiver finger demodulator path, for example receiver finger demodulator path 302, for transformation into another Walsh symbol stream 339.

Each receiver finger demodulator path 301 includes an OQPSK despreader 320 and an FHT 332. Upon receiving set of gain adjusted in-phase (I) and quadrature (Q) components 219, OQPSK despreader 220 for removes a PN code sequence from set of in-phase (I) and quadrature (Q) components 219 to produce a corresponding data in-phase (I) and quadrature (Q) component 323 at the time offset. FHT 332 then estimates a set of Walsh symbol energy values indexed from zero to sixty-three, referred to herein as a Walsh symbol stream 338 from corresponding data in-phase (I) and quadrature (Q) component 323. A demodulator 340 then combines Walsh symbol stream 338 with a plurality of other Walsh symbol streams 339 from a plurality of other receiver finger demodulator paths to produce the second plurality of Walsh symbol energy values 342. Accordingly, second plurality of Walsh symbol energy values 342 is comprised of a Walsh symbol stream. For purposes of discussion, receiver finger demodulator path 301 as well as the plurality of other receiver finger demodulator paths and demodulator 340 may be collectively referred to as a finger Walsh energy generator 350.

Spread spectrum receiver 300 further includes a deinterleaver 355 and a decoder 360. Deinterleaver 355 operates to restore an order to second plurality of Walsh symbol energy values 342 to yield a sequence of deinterleaved transmitted Walsh channel symbols representative of the mobile communication signal 107. The sequence of deinterleaved transmitted Walsh channel symbols are input to a decoder 359 which estimates a sequence of information bits from the sequence of deinterleaved transmitted Walsh channel symbols and outputs a decoded signal 370 representative of mobile communication signal 107.

Spread spectrum receiver 300 may be implemented using an application specific integrated circuit (ASIC) or using other suitable means. The current design trend of lowering the Eb/Io operation of spread spectrum receiver 300, thereby providing an increased system capacity and transmission range, is compromised when the multipath signal searcher 200 is unable to detect incoming multipath replicas. Accordingly, less total signal energy in second plurality of Walsh symbol energy values 342 is available for demodulation and decoding.

Figure 4:
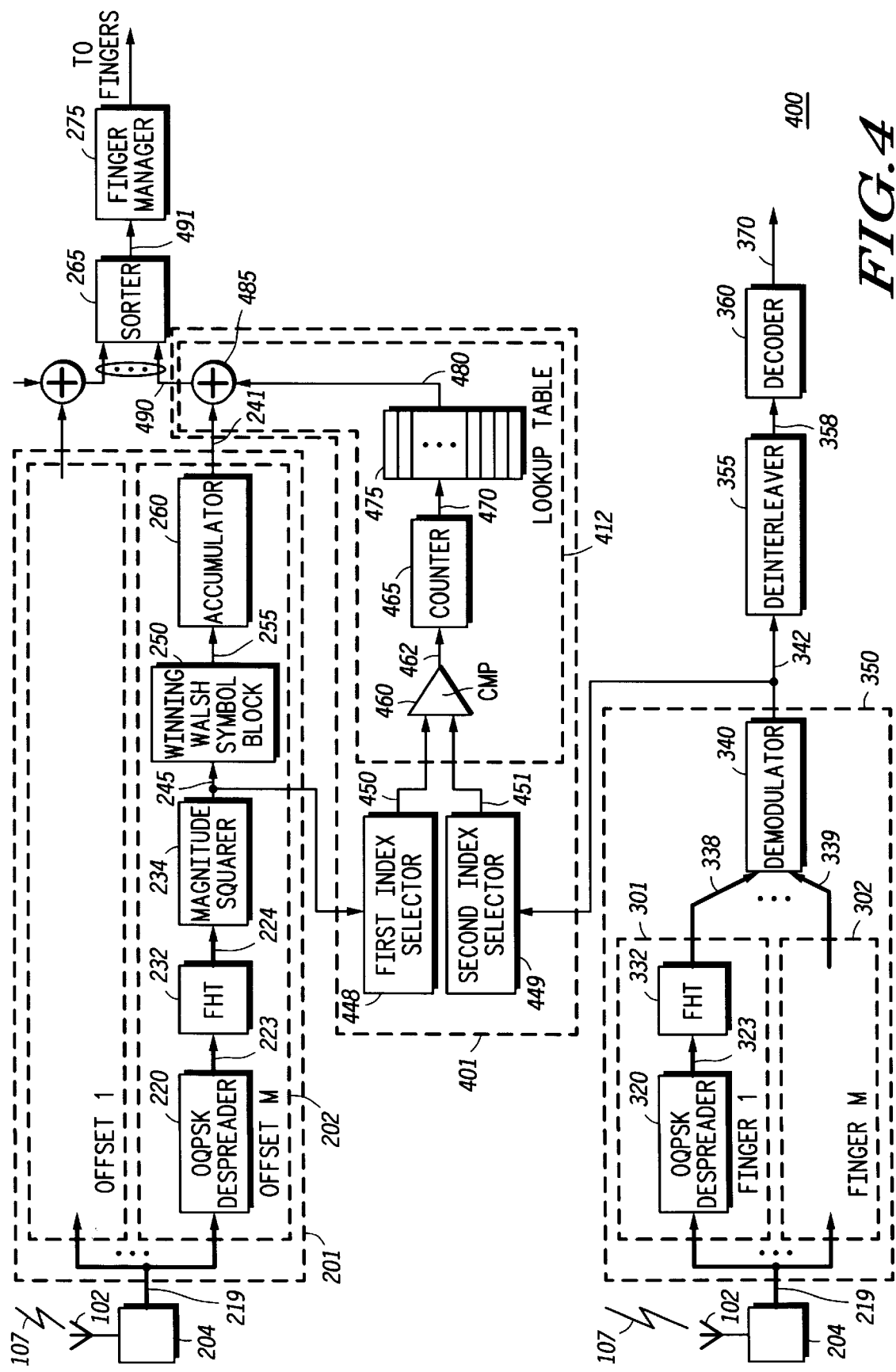
FIG. 4 is a block diagram of a base station receiver assembly 400 which includes multipath signal searcher 200, spread spectrum receiver 300 and a search metric adjustor 401, according to a preferred embodiment of the present invention.

FIG. 4 is a block diagram 400 of a base station receiver assembly which includes multipath signal searcher 200, spread spectrum receiver 300 and a search metric adjustor, according to a preferred embodiment of the present invention. Search metric adjustor 401 produces an energy correction to energy metric 241, forming a signal 490 that is forwarded to sorter 265. As a result, search metric adjustor provides an increased multipath detection probability over that which is achieved using only the plurality of energy metrics provided by prior art multipath signal searchers. According to the preferred embodiment of the present invention, the energy correction is based on a sum of energy metric 241 and an energy correction value 480 generated by search metric adjustor 401. Energy correction value 480 is results from a comparison of first plurality of Walsh symbol energy values output from multipath signal searcher 200 with second plurality of Walsh symbol energy values output from finger Walsh energy generator 350.

Search metric adjustor 401 includes a first index selector 448, a second index selector 449, and a comparing circuit 412. Comparing circuit 412 includes a comparator 460, a counter 465, a look-up-table 475 and an adder 485. Search metric adjustor 401, which may be implemented in using any number of suitable methods, operates in concert with multipath signal searcher 200 and spread spectrum receiver 300 to generate signal 490 as follows. First index selector 448 for selecting a first set of top Walsh symbol indices 450 from first plurality of Walsh symbol energy values 245, output from magnitude squarer 234 (discussed in connection with FIG. 2). The selection of the first set of top Walsh symbol indices is based on an energy value of each of first plurality of Walsh symbol energy values 245. In the preferred embodiment, first index selector 448 selects three indices corresponding to the top three energy values of first plurality of Walsh symbol energy values 245. Similarly, a second index selector 449 selects a second set of top Walsh symbol indices 451 from second plurality of Walsh symbol energy values 342 output from finger Walsh energy generator 350. In the preferred embodiment, second index selector 449 selects two indices corresponding the top two energy values of second plurality of Walsh symbol energy values 342. It is contemplated that any number of indices may be selected by first index selector 448 and second index selector 449.

Next, a comparator 460 compares first set of top Walsh symbol indices 450 to second set of top Walsh symbol indices 451 to yield a comparator value 462. Comparator 460 yields a comparator value of one when at least two indices from first and second set of top Walsh symbol indices are identical. Comparator 460 yields a comparator value of zero when none of the indices from the first and second set of top Walsh symbol indices identical. A comparator value of one is representative of a likelihood that the time offset corresponds to a valid time offset of the mobile communication signal. A counter 465 counts a number of times comparator 460 yielded a comparator value of one, over a time period of N Walsh symbols where N is preferably six. Accordingly, counter 465 yields a walsh symbol match count (WSMC) 470, having an integer value from zero to N, depending on how many times at least one index from both the first and second set of top Walsh symbols matched during the time period. The time period may be any length of time but is preferably equivalent to six Walsh symbols. Thus for a time period equivalent to six Walsh symbols, counter 465 may yield an integer value from zero to six.

A look-up table 475 converts WSMC 470 to an energy correction value 480. Energy correction value 480 is a predetermined energy value assigned based on WSMC 470 input to look-up table 475. For example, in the preferred embodiment a WSMC of zero yields an energy value of negative one-hundred, while a WSMC of one yields an energy value of zero. Similarly, a WSMC of two yields a energy correction value of fifty, a WSMC of three yields a energy correction value of two-hundred, and a WSMC of four yields a energy correction value of three-hundred. Further, a WSMC of five yields a energy correction value of three-hundred, and a WSMC of six yields a energy correction value of four-hundred. An adder 485 then adds the resulting energy correction value 480 to energy metric 241 output from searcher path 202, to produce signal 490. Accordingly, signal 490 is an adjusted energy value.

If an accurate selection of a time offset was previously made by multipath signal searcher 200, then the comparison of first and second set of top Walsh symbol indices will yield a high WSMC output from counter 465, for the time period. In addition to a first measure of likelihood provided by energy metric 241, energy correction value 480 provides a second measure of likelihood to sorter 265 that the time offset at which demodulation is occurring is a valid time offset of mobile communication signal 107. Thus, a best set of time offsets 491 output from sorter 265 is substantially more accurate than best set of time offsets 291, generated as a result of energy metric 241 provided in the prior art design.

Search metric adjustor 401 may be implemented using any suitable method such as a software algorithm or an application specific integrated circuit.

The total M offsets are sorted in descending order according to the adjusted energy values of signals input to sorter 265, such as signal 490. Therefore a signal received by multipath signal searcher 200 which has a low energy value 241 but is determined to have a high WSMC 470 may be accepted as a candidate for receiver finger assignment by finger manager 275. As a result, weak mobile communication signals are more likely to be detected, and the capability of multipath signal searcher 200 to select corresponding time offsets at which successful receiver demodulation may occur, is enhanced.

The IS-95 system and its application in CDMA systems have been specifically referred to herein, but the present invention is applicable to any CDMA wireless communication system.

The principles of the present invention which apply to a cellular-based digital communication system, include but are not limited to personal communicating systems, trunked systems, satellite systems and data networks. Likewise, the principles of the present invention which apply to all types of digital radio frequency channels also apply to other types of communication channels, such as radio frequency signaling channels, electronic data buses, wireline channels, optical fiber links and satellite links.

It will furthermore be apparent that other forms of the invention, and embodiments other than the specific embodiments described above, may be devised without departing from the spirit and scope of the appended claims and their equivalents.

What is claimed is:

1. A multipath searcher for use in a code division multiple access (CDMA) wireless communication system conveying a mobile communication signal, the multipath searcher comprising:

a searcher path having as inputs a set of in-phase (I) and quadrature (Q) components at a time offset, for estimating a first plurality of Walsh symbol energy values, and selecting a first set of top Walsh symbol indices from the first plurality of Walsh symbol energy values;

a finger Walsh energy generator having as inputs the set of in-phase (I) and quadrature (Q) components, for estimating a second plurality of Walsh symbol energy values and selecting a second set of top Walsh symbol indices from the second plurality of Walsh symbol energy values;

a search metric adjuster having as inputs, the first set of top Walsh symbol indices, the second set of top Walsh symbol indices, and the energy metric, for generating a signal representative of a likelihood that the time offset corresponds to a valid time offset of the mobile communication signal during a time period equivalent to N Walsh symbols, wherein the signal representative of the likelihood that the time offset corresponds to the valid time offset is based on a number of identical indices from the first set of top Walsh symbol indices and the second set of top Walsh symbol indices; and a look-up table for outputting an energy correction value based on the signal representative of the likelihood that the time offset corresponds to the valid time offset.

2. The multipath searcher according to claim 1, wherein the multipath search further comprises the search metric adjustor having as inputs the first plurality of Walsh symbol energy values indexed from zero to sixty-three, and the second plurality of Walsh symbol energy values indexed from zero to sixty-three.

3. The multipath searcher according to claim 1, wherein the signal comprises an adjusted energy value.

4. The multipath searcher according to claim 1, wherein the time period is equivalent to six Walsh symbols.

5. The multipath searcher according to claim 2, wherein the search metric adjustor comprises:

a first index selector for selecting a first set of top Walsh symbol indices from the first plurality of Walsh symbol energy values, the selection of the first set of top Walsh symbol indices based on an energy value of each of the first plurality of Walsh symbol energy values;

a second index selector for selecting a second set of top Walsh symbol indices from the second plurality of Walsh symbol energy values, the selection of the second set of top Walsh symbol indices based on an energy value of each of the second plurality of Walsh symbol energy values; and a comparing circuit for generating the signal based on a comparison of the first set of top Walsh symbol indices to the second set of top Walsh symbol indices.

6. The multipath searcher according to claim 5, wherein the comparing circuit comprises:

a comparator for comparing the first set of top Walsh symbol indices to the second set of top Walsh symbol indices to yield a comparator value, the comparator value representative of a likelihood that the time offset corresponds to a valid time offset of the mobile communication signal;

a counter for counting a number of times the comparator yielded the comparator value of one for the time period, to produce an walsh symbol match count;

a look-up table for converting the walsh symbol match count to an energy correction value; and an adder for adding the energy correction value to the energy metric to produce the signal.

7. The multipath searcher according to claim 6, wherein the comparator yields a comparator value of one when at least two indices from the first and second set of top Walsh symbol indices are identical, and yields a comparator value of zero when none of the indices from the first and second set of top Walsh symbol indices are identical.

8. The multipath searcher according to claim 6, wherein the walsh symbol match count is an integer.

9. The multipath searcher according to claim 2, wherein the finger Walsh energy generator further comprises:

a receiver finger demodulator path for despreading the set of in-phase (I) and quadrature (Q) components at an assigned time offset to produce a Walsh symbol stream comprised of a plurality of Walsh symbol energy values indexed from zero to sixty-three at the assigned time offset; and a demodulator for combining the Walsh symbol stream with a plurality of other Walsh symbol streams to produce the second plurality of Walsh symbol energy values.

10. The multipath searcher according to claim 9, wherein the CDMA wireless communication system receiver further comprises:

a sorter having as inputs the signal and a plurality of other signals corresponding at a plurality of other time offsets, for sorting and ranking the signal with the plurality of other signals to produce a best set of time offsets substantially likely to correspond to a plurality of valid time offsets associated with the mobile communication signal;

a finger manager for directing the receiver finger demodulator path to demodulate the mobile communication signal at the assigned time offset, the assigned time offset selected from the best set of time offsets;

a deinterleaver for restoring an order to the second plurality of Walsh symbol energy values to produce a sequence of deinterleaved transmitted Walsh channel symbols representative of the mobile communication signal; and a decoder for estimating a sequence of information bits from the sequence of deinterleaved transmitted Walsh channel symbols to produce a decoded signal substantially identical to the mobile communication signal.

11. The multipath searcher according to claim 10, wherein the first set of top Walsh symbol indices and the second set of top Walsh symbol indices are substantially identical for the time period at the best set of time offsets.

12. The multipath searcher according to claim 2, wherein the searcher path further comprises:

an OQPSK despreader for removing a PN code sequence from the set of in-phase (I) and quadrature (Q) components to produce a corresponding data in-phase (I) and quadrature (Q) component at the time offset;

a fast hadamard transform for estimating a set of Walsh symbol energy values indexed from zero to sixty-three from the corresponding data in-phase (I) and quadrature (Q) component;

a magnitude squarer for computing an energy of the set of Walsh symbol energy values indexed from zero to sixty-three to yield the first plurality of Walsh symbol energy values;

a winning Walsh symbol block for selecting one of the first plurality of Walsh symbol energy values, the selection based on the one of the first plurality of Walsh symbol energy values having the largest magnitude; and an accumulator for accumulating the one of the first plurality of Walsh symbol energy values during the time period to yield an energy metric representative of a likelihood that the time offset at which the searcher path is searching, corresponds to a valid time offset of mobile communication signal.

13. A search metric adjustor for use in a code division multiple access (CDMA) wireless communication system conveying a mobile communication signal, the CDMA wireless communication system including a multipath signal searcher having a plurality of searcher paths for searching at for the mobile communication at a plurality of valid time offsets, and a spread spectrum receiver including a finger Walsh energy generator for receiving a mobile communication signal, the search metric adjustor comprising:

a first index selector for selecting a first set of top Walsh symbol indices from a first plurality of Walsh symbol energy values output from one of the plurality of searcher paths at a time offset, the selection of the first set of top Walsh symbol indices based on an energy value of each of the first plurality of Walsh symbol energy values;

a second index selector for selecting a second set of top Walsh symbol indices from a second plurality of Walsh symbol energy values output from the finger Walsh energy generator, the selection of the second set of top Walsh symbol indices based on an energy value of each of the second plurality of Walsh symbol energy values;

a comparator for comparing the first set of top Walsh symbol indices to the second set of top Walsh symbol indices during a time period to yield a comparator value, the comparator value representative of a likelihood that the time offset corresponds to a valid time offset of the mobile communication signal;

a counter for counting a number of times the comparator yielded the comparator value of one during the time period, to produce a walsh symbol match count;

a look-up table for converting the walsh symbol match count to an energy correction value; and an adder for adding the energy correction value to an energy metric, the energy metric calculated by the one of the plurality of searcher paths to produce the signal.

14. The search metric adjustor according to claim 13, wherein the signal is comprised of an adjusted energy value.

15. The search metric adjustor according to claim 13, wherein the comparator yields a comparator value of one when two indices from the first and second set of top Walsh symbol indices are identical, and yields a comparator value of zero when two indices from the first and second set of top Walsh symbol indices are not identical.

16. The search metric adjustor according to claim 13, wherein the walsh symbol match count is an integer.

17. The search metric adjustor according to claim 13, wherein the time period is equivalent to six Walsh symbols.

18. The search metric adjustor according to claim 13, wherein the one of the plurality of searcher paths comprises:

an OQPSK despreader for removing a PN code sequence from a set of in-phase (I) and quadrature (Q) components resulting from receiving and gain adjusting the mobile communication signal by a receiver front end, to produce a corresponding data in-phase (I) and quadrature (Q) component at the time offset;

a fast hadamard transform for estimating a set of Walsh symbol energy values indexed from zero to sixty-three from the corresponding data in-phase (I) and quadrature (Q) component;

a magnitude squarer for computing an energy of the set of Walsh symbol energy values indexed from zero to sixty-three to yield the first plurality of Walsh symbol energy values;

a winning Walsh symbol block for selecting one of the first plurality of Walsh symbol energy values, the selection based on the one of the first plurality of Walsh symbol energy values having the largest magnitude; and an accumulator for accumulating the one of the first plurality of Walsh symbol energy values during the time period to yield the energy metric representative of a likelihood that the time offset at which the searcher path is searching corresponds to a valid time offset of mobile communication signal.

19. The search metric adjustor according to claim 13, wherein the finger Walsh energy generator comprises:

an OQPSK despreader for removing a PN code sequence from the set of in-phase (I) and quadrature (Q) components to produce a corresponding data in-phase (I) and quadrature (Q) component at an assigned time offset;

a fast hadamard transform for estimating a Walsh symbol stream comprised of a plurality of Walsh symbol energy values indexed from zero to sixty-three, from the corresponding data in-phase (I) and quadrature (Q) component; and a demodulator for combining the Walsh symbol stream with a plurality of other Walsh symbol streams to produce the second plurality of Walsh symbol energy values.

20. A method for performing a signal search using a base station receiver assembly in a code division multiple access (CDMA) wireless communication system, the base station receiver assembly including multipath signal searcher having a plurality of searcher paths for searching over a plurality of valid time offsets for a mobile communication signal, and a spread spectrum receiver for receiving the mobile communication signal, the method comprising:

estimating a first plurality of Walsh symbol energy values indexed from zero to sixty-three from a set of in-phase (I) and quadrature (Q) components at a time offset, by one of the plurality of searcher paths;

estimating an energy metric from the set of in-phase (I) and quadrature (Q) components at the time offset, by the one of the plurality of searcher paths;

estimating a second plurality of Walsh symbol energy values indexed from zero to sixty-three from the set of in-phase (I) and quadrature (Q) components, by the spread spectrum receiver; and generating an adjusted energy value representative of a likelihood that the time offset corresponds to a valid time offset of the mobile communication signal during a time period, the adjusted energy value based on adding the energy metric to the energy correction value, the energy correction value resulting from a number of identical indices from the first plurality of Walsh symbol energy values and the second plurality of Walsh symbol energy values.

21. The method for performing a signal search according to claim 20, further comprising:

selecting a first set of top Walsh symbol indices from the first plurality of Walsh symbol energy values, the selection of the first set of top Walsh symbol energy values based on an energy value of each of the first plurality of Walsh symbol energy values;

selecting a second set of top Walsh symbol indices from the second plurality of Walsh symbol energy values, the selection of the second set of top Walsh symbol energy values based on an energy value of each of the first plurality of Walsh symbol energy values;

comparing the first set of top Walsh symbol indices to the second set of top Walsh symbol indices to produce a comparator value, the comparator value representative of a likelihood that the time offset corresponds to a valid time offset of the mobile communication signal;

counting a number of times the comparator yielded a comparator value of one for the time period, to produce a walsh symbol match count;

converting the walsh symbol match count to the energy correction value; and adding the energy correction value to the energy metric to produce the adjusted energy value.

22. The method for performing a signal search according to claim 21, further comprising:

sorting and ranking the adjusted energy value with a plurality of other adjusted energy values which resulted from searching at other time offsets, by a sorter to produce a best set of time offsets;

directing a plurality of receiver finger demodulator paths to demodulate the mobile communication signal based on the best set of time offsets, to produce a plurality of Walsh symbol streams, each of the plurality of Walsh symbol steams comprising a set of Walsh symbol energy values indexed from zero to sixty-three;

demodulating the plurality of Walsh symbol streams, to yield the second plurality of Walsh symbol energy values;

restoring an order to the second plurality of Walsh symbol energy values to produce a sequence of deinterleaved transmitted Walsh channel symbols representative of the mobile communication signal; and estimating a sequence of information bits from the sequence of deinterleaved transmitted Walsh channel symbols to produce a decoded signal substantially identical to the mobile communication signal.

* * * * *